Feb. 28, 1950     A. R. STEINHILB     2,499,079

CANDLE HOLDER FOR CAKES

Filed March 20, 1948

INVENTOR.
ARTHUR R. STEINHILB
BY Gerald P. Welch
ATTORNEY

Patented Feb. 28, 1950

2,499,079

UNITED STATES PATENT OFFICE 2,499,079

CANDLE HOLDER FOR CAKES

Arthur R. Steinhilb, Milwaukee, Wis.

Application March 20, 1948, Serial No. 16,082

2 Claims. (Cl. 67—23)

This invention relates to improvements in candle holders for cakes, and more particularly to a novel candle holder adapted for insertion into the side of a cake.

An object of the invention is to provide a device of the type which may be inserted into the side of a birthday cake and which will provide means for supporting a candle laterally of the cake and which will have an ornamental figure such as an animal likeness at its outer end.

Another object of the invention is to provide a device of the type which may be folded for packing and storage.

Another object of the invention is to provide a device of the type which will be simple and economical of manufacture.

Other and further objects of the invention will appear as the description proceeds, reference being had to the accompanying drawing, in which—

Figure 1:
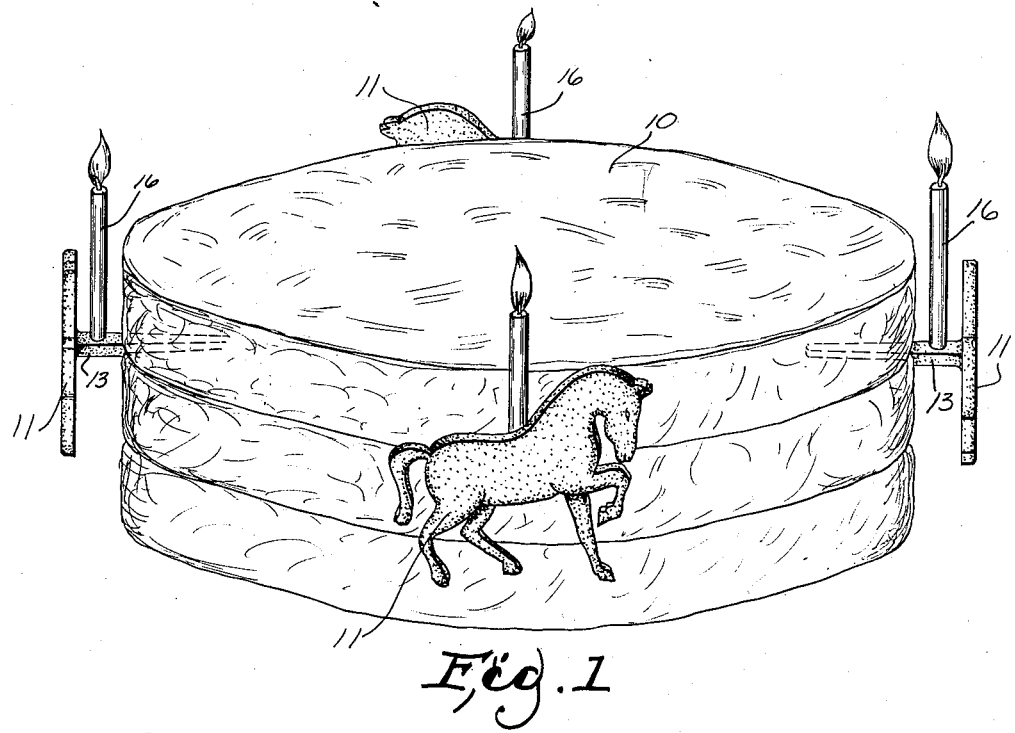
Fig. 1 is a view in perspective of a birthday cake equipped with a plurality of candle holders embodying my invention.
Figure 2:
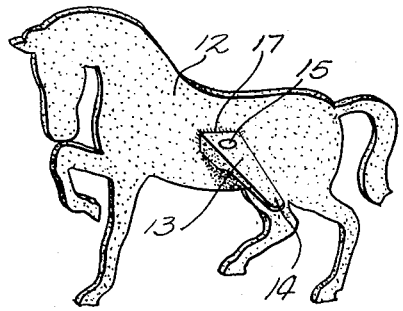
Fig. 2 is a view in perspective of one of the candle holders viewed from the attachment side.
Figure 3:
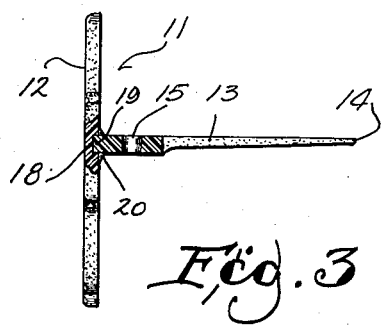
Fig. 3 is a view partly in elevation and partly in section taken from the side of one of the elements.

Referring more particularly to the drawing, the numeral 10 refers to a birthday cake or the like, having a plurality of candle holders 11 inserted therearound. As shown in Figs. 2 and 3, one form of the device comprises an animal figure 12 vertically disposed and secured to a horizontal element 13 pointed at 14 for insertion into a cake or the like and having an aperture at 15 tapered reducedly downwardly for supporting a candle 16. The two elements 12 and 13 may be secured as by an adhesive at 17, or the element 12 may have an appropriate depression at 18 to receive the end 19 of element 13. This type may be secured by a forced fit whereby the element may be detached for packing or storing or they may be secured by an adhesive at 20.

Figure 4:
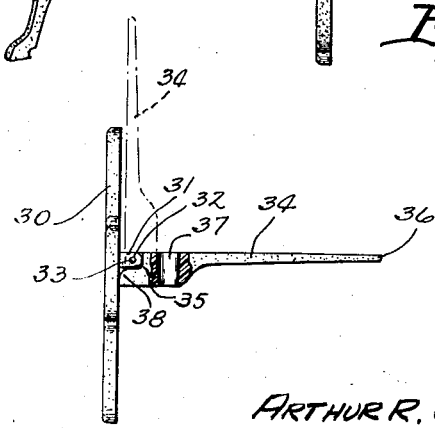
Fig. 4 is a plan view partly in section and partly in elevation of a modified form of the invention.

In the modified form of the invention shown in Fig. 4 the ornamental figure element 30 has a single or double projection 31 provided with an eye or eyes as at 32 and a pin 33 journaled therein. The element 34 is similarly apertured in its end 35 to receive the pin 33 whereby the member 34 can be folded in alignment with the element 30. The element 34 is pointed at its end 36 for insertion into the cake and has a downwardly reducedly tapered aperture at 37 to receive a candle. The shoulder at 38 will maintain the ornament 30 in vertical position when the element 34 is horizontally inserted into the side of a cake or the like.

It will be understood that the device is capable of many modifications in structure and design, without departing from the spirit of the invention, within the scope of the appended claims.

Having thus described my invention, what I claim and desire to secure by Letters Patent of the United States is:

1. A pointed member adapted for insertion into the side of a cake or the like having a tapered aperture for retention of a candle, a flat ornamental member pivoted to the end of said pointed member, and means on said pointed member to retain the ornamental member disposed at right angles to the horizontal plane of said pointed member when the latter is inserted horizontally into a cake.

2. In combination with a candle, a pointed holder adapted for horizontal insertion into the side of a cake and having a tapered aperture for the vertical retention of said candle, a plane ornamental figure pivoted to said holder for limited rotation on a horizontal axis, and a shoulder on said holder for maintaining said figure member vertically at right angles thereto when the holder is in horizontal placement in the side of a cake.

ARTHUR R. STEINHILB.

REFERENCES CITED

The following references are of record in the file of this patent:

UNITED STATES PATENTS

| Number | Name | Date |
|---|---|---|
| 266,463 | Grahner | Oct. 24, 1882 |
| 1,131,528 | Lance | Mar. 9, 1915 |
| 1,561,508 | Daniel | Nov. 17, 1925 |

FOREIGN PATENTS

| Number | Country | Date |
|---|---|---|
| 444 | Great Britain | of 1906 |